US009647494B2

(12) United States Patent
Hui et al.

(10) Patent No.: US 9,647,494 B2
(45) Date of Patent: May 9, 2017

(54) FAST NETWORK FORMATION USING A BATTERY-BACKED NETWORK BACKBONE

(71) Applicant: Cisco Technology, Inc., San Jose, CA (US)

(72) Inventors: Jonathan W. Hui, Belmont, CA (US); Wei Hong, Berkeley, CA (US); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 167 days.

(21) Appl. No.: 14/569,060

(22) Filed: Dec. 12, 2014

(65) Prior Publication Data

US 2016/0134161 A1 May 12, 2016

Related U.S. Application Data

(60) Provisional application No. 62/076,799, filed on Nov. 7, 2014.

(51) Int. Cl.
| | | |
|---|---|---|
| *H04L 12/733* | (2013.01) | |
| *H04L 12/751* | (2013.01) | |
| *H02J 9/06* | (2006.01) | |
| *H04L 12/703* | (2013.01) | |
| *H02J 3/38* | (2006.01) | |
| *H04L 12/729* | (2013.01) | |
| *H04W 40/04* | (2009.01) | |
| *H04W 40/10* | (2009.01) | |
| *H04L 12/707* | (2013.01) | |
| *H04L 12/753* | (2013.01) | |

(52) U.S. Cl.
CPC ............. *H02J 9/061* (2013.01); *H02J 3/383* (2013.01); *H04L 45/28* (2013.01); *H04L 45/125* (2013.01);
(Continued)

(58) Field of Classification Search
CPC ......... H04L 45/22; H04L 45/28; H04L 45/48; H04L 41/0654; H04W 40/04; H04W 40/10
See application file for complete search history.

(56) References Cited

U.S. PATENT DOCUMENTS

2011/0054709 A1\* 3/2011 Son .......................... H02J 3/06
 700/286
2012/0307629 A1 12/2012 Vasseur et al.
(Continued)

FOREIGN PATENT DOCUMENTS

WO WO-2013/009831 A1 1/2013

OTHER PUBLICATIONS

International Search Report mailed Jan. 27, 2016 in connection with PCT/US2015/058751.
(Continued)

*Primary Examiner* — Ahmed Elallam
(74) *Attorney, Agent, or Firm* — Parker Ibrahim & Berg LLC; James M. Behnke; Stephen D. LeBarron

(57) ABSTRACT

In one embodiment, a device in a network detects a power outage event in the network. The device causes an unprotected node in the network to use a first routing topology that includes a power-protected backbone, in response to detecting the power outage event. The power-protected backbone includes one or more nodes that are protected against the power outage event and the unprotected node is not protected against the power outage event. The device routes data for the unprotected node using the first routing topology. The device causes the unprotected node to use a second routing topology that optimizes a path from the unprotected node to a root node of the network based on one or more performance criteria.

22 Claims, 15 Drawing Sheets

(52) U.S. Cl.
CPC .............. *H04L 45/22* (2013.01); *H04L 45/48* (2013.01); *H04W 40/04* (2013.01); *H04W 40/10* (2013.01)

(56) References Cited

U.S. PATENT DOCUMENTS

| | | | |
|---|---|---|---|
| 2012/0320923 A1 | 12/2012 | Vasseur et al. | |
| 2012/0324273 A1 | 12/2012 | Shaffer et al. | |
| 2013/0010615 A1* | 1/2013 | Hui .................... | H04L 41/0806 370/252 |
| 2014/0092753 A1* | 4/2014 | Vasseur ............... | H04L 41/5009 370/248 |

OTHER PUBLICATIONS

Gnawali et al., "The Minimum Rank with Hysteresis Objective Function", Request for Comments 6719, Sep. 2012, 13 pages, Internet Engineering Task Force Trust.
Thubert P., "Objective Function Zero for the Routing Protocol for Low-Power and Lossy Networks (RPL)", Request for Comments 6552, Mar. 2012, 14 pages, Internet Engineering Task Force Trust.
Vasseur et al., "Routing Metrics Used for Path Calculation in Low-Power and Lossy Networks", Request for Comments 6551, Mar. 2012, 30 pages, Internet Engineering Task Force Trust.
Winter et al., "RPL: IPv6 Routing Protocol for Low-Power and Lossy Networks", Request for Comments 6550, Mar. 2012, 157 pages, Internet Engineering Task Force Trust.

* cited by examiner

FAST NETWORK FORMATION USING A BATTERY-BACKED NETWORK BACKBONE

RELATED APPLICATIONS

This application claims priority to U.S. Provisional Application No. 62/076,799, filed Nov. 7, 2014, entitled: "FAST NETWORK FORMATION USING A BATTERY-BACKED NETWORK BACKBONE," by Hui et al., the contents of which are herein incorporated by reference.

TECHNICAL FIELD

The present disclosure relates generally to computer networks, and, more particularly, to (re)forming a network using a network backbone of power-protected (e.g., battery-backed) devices.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability of a device, etc. Changing environmental conditions may also affect device communications. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs.

In contrast to many traditional computer networks, LLN devices typically communicate via shared-media links. For example, LLN devices that communicate wirelessly may communicate using overlapping wireless channels (e.g., frequencies). In other cases, LLN devices may communicate with one another using shared power line communication (PLC) links. For example, in a Smart Grid deployment, an electric utility may distribute power to various physical locations. At each location may be a smart meter that communicates wirelessly and/or using the electrical power distribution line itself as a communication medium.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
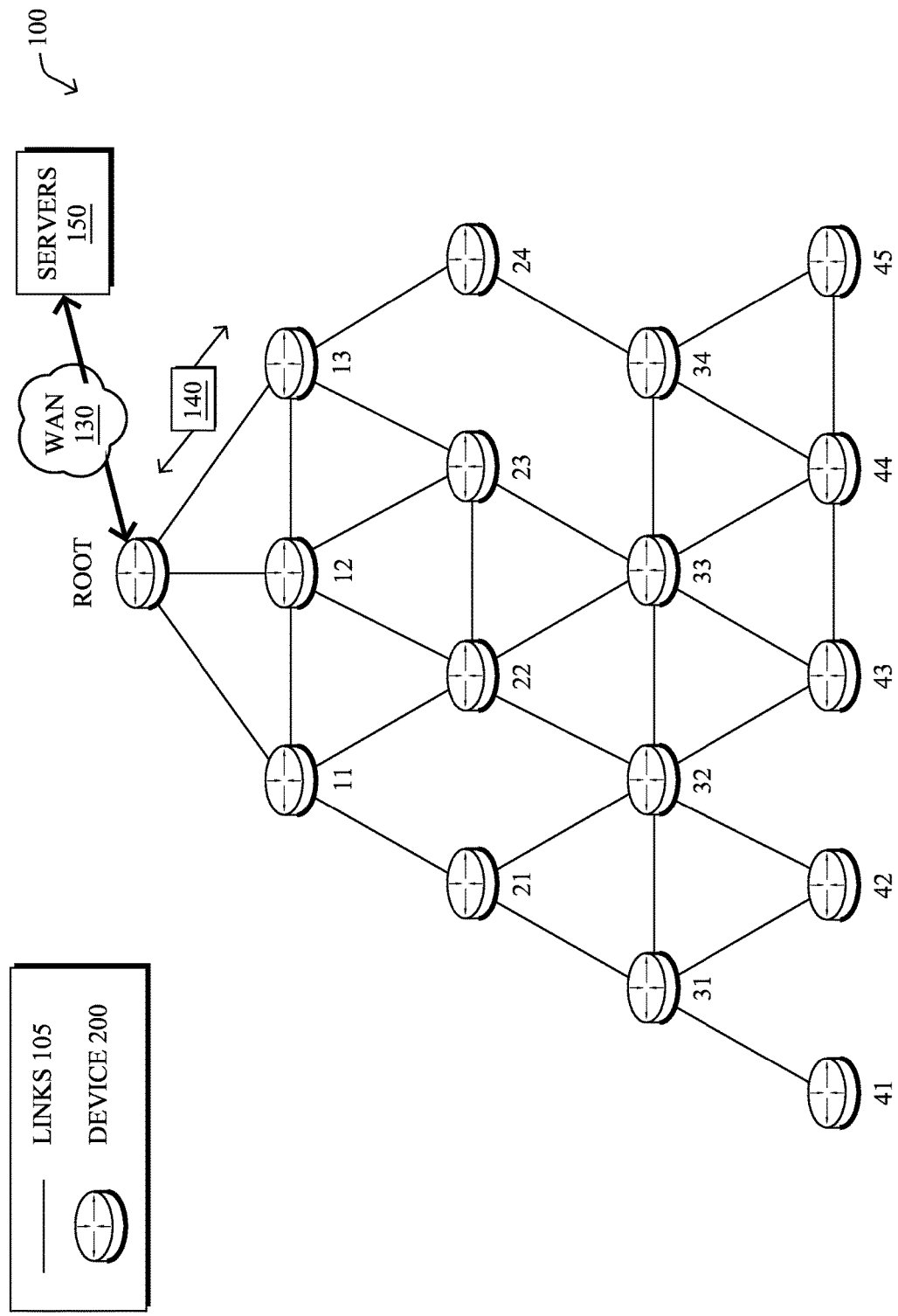
FIG. 1 illustrates an example communication network.

According to one or more embodiments of the disclosure, a device in a network detects a power outage event in the network. The device causes an unprotected node in the network to use a first routing topology that includes a power-protected backbone, in response to detecting the power outage event. The power-protected backbone includes one or more nodes that are protected against the power outage event and the unprotected node is not protected against the power outage event. The device routes data for the unprotected node using the first routing topology. The device causes the unprotected node to use a second routing topology that optimizes a path from the unprotected node to a root node of the network based on one or more performance criteria.

In further embodiments, a node in a network powers on after a power outage event in the network. The node routes data using a first routing topology that includes a power-protected backbone. The first routing topology includes a path from the node to a power-protected device in the backbone that is nearest to the node in the network. The node selects a parent of the node as part of a second routing topology that optimizes a path from the node to a root of the network based on one or more performance criteria. The node routes data via the selected parent using the second routing topology.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE 1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "Root," "11," "12," . . . "45," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. The illustrative Root node, such as a field area router (FARs), may interconnect the local network with a WAN 130, via which the root node may communicate with one or more other relevant devices such as management devices or servers 150, e.g., a network management server (NMS), a dynamic host configuration protocol (DHCP) server, a constrained application protocol (CoAP) server, a power outage management system (OMS), etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
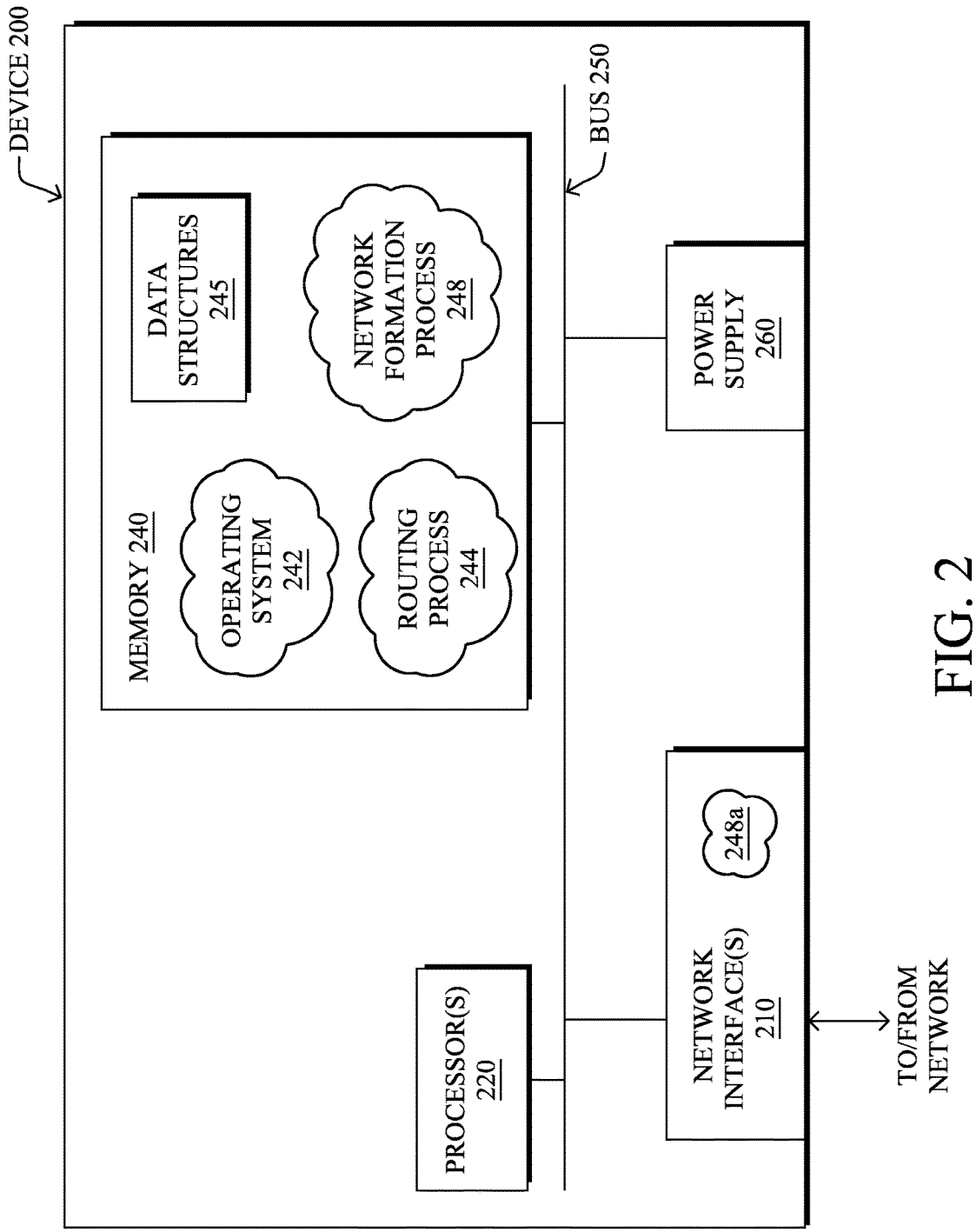
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

In some embodiments, power supply 260 may be configured to provide a certain degree of protection to device 200 against a power outage event. For example, power supply 260 may include a battery backup system, ultra-capacitor or other charge storage device, solar panel, generator, or any other system that may allow device 200 to continue to operate when the primary source of power is removed from device 200. However, as would be appreciated, many LLN devices are typically limited in their capabilities and will not be equipped with such a power-protection mechanism.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244 and an illustrative network formation process 248, as described herein. Note that while process 248 is shown in centralized memory 240, alternative embodiments provide for the process to be specifically operated within the network interfaces 210, such as a component of a MAC layer (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 includes computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are included in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by routing process 244) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks"<RFC 6551> by Vasseur, et al. (March 2012 version). Further, an example OF (e.g., a default OF) may be found in an IETF RFC, entitled "RPL Objective Function 0" <RFC 6552> by Thubert (March 2012 version) and "The Minimum Rank Objective Function with Hysteresis" <RFC 6719> by O. Gnawali et al. (September 2012 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
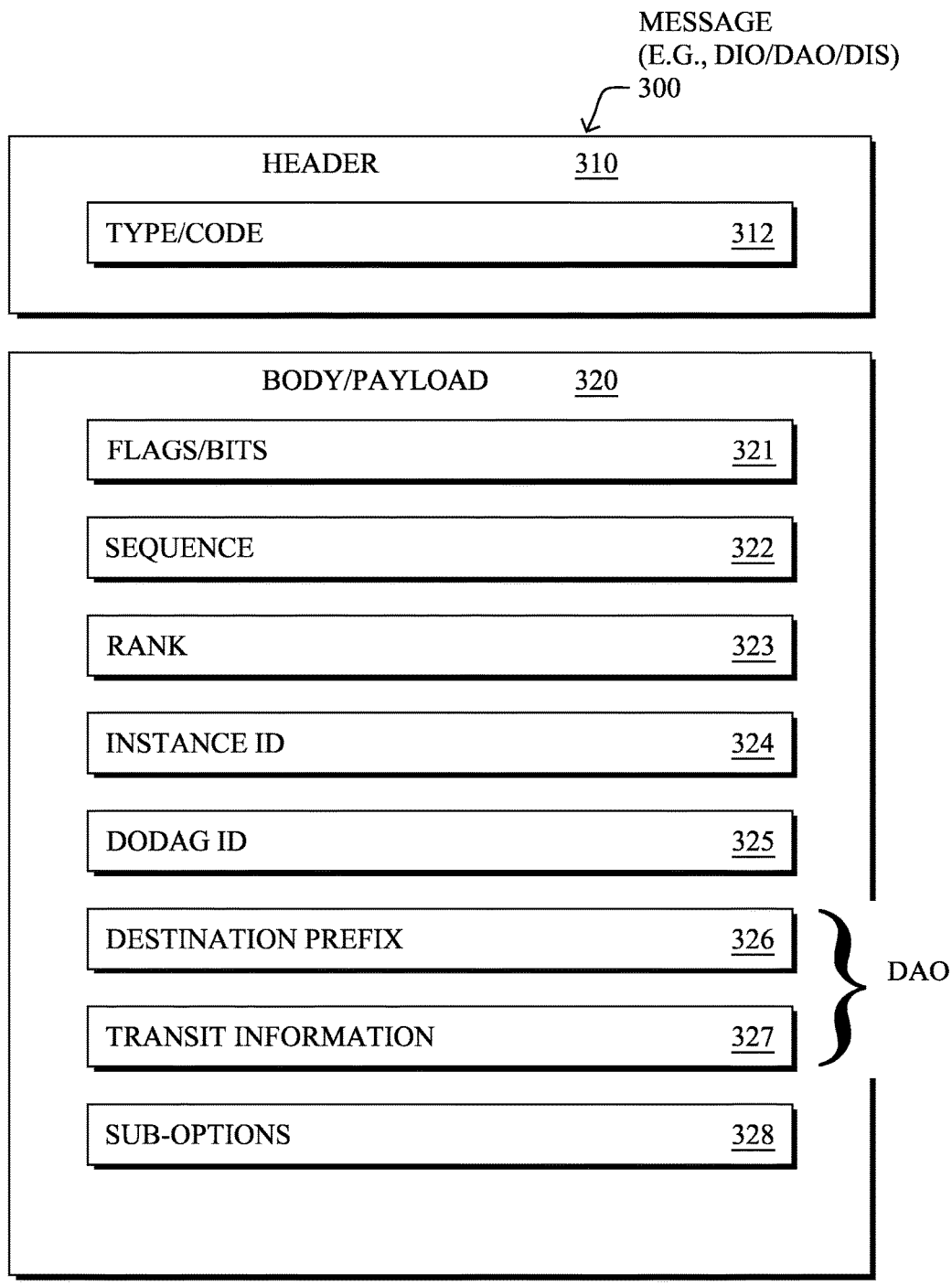
FIG. 3 illustrates an example routing protocol message format.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
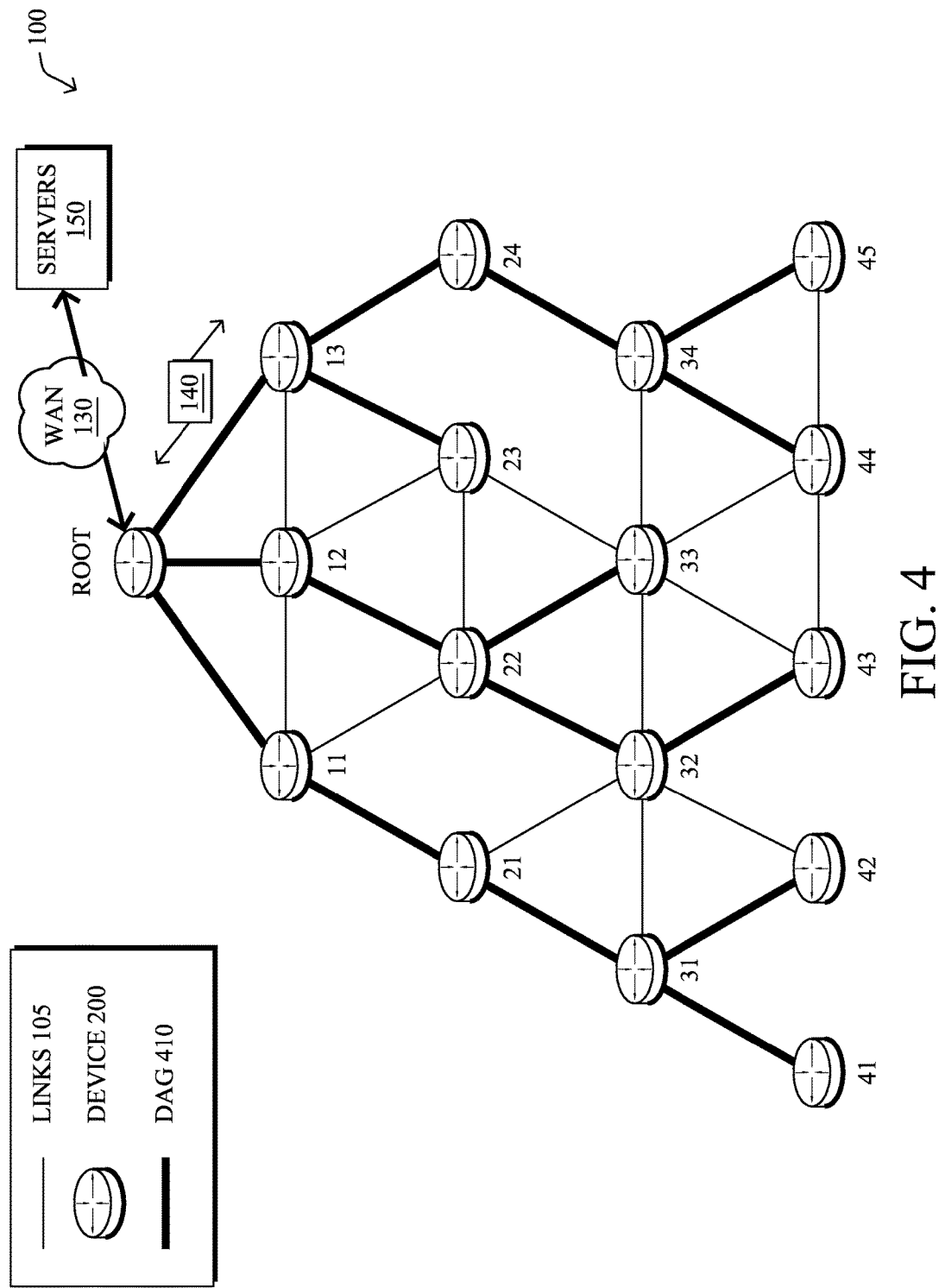
FIG. 4 illustrates an example directed acyclic graph (DAG) in the network.

FIG. 4 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein.

As noted above, IoT networks may include any number of devices with varying capabilities. In some cases, a subset of the devices in an IoT network may be protected against power outages, thereby allowing the devices to continue operating during a power outage event. In a typical deployment, protection against a power outage is provided by a battery-backup system on the device, although other protection mechanisms are also envisioned. For example, in a distributed automation (DA) deployment, DA endpoints, range extender (RE) devices that provide connectivity between DA devices, and associated field area routers (FARs), may each include battery-backup systems, to allow the automation process to continue during a power outage. Also of note is that most LLN devices are typically unprotected against power outages. For example, smart meters typically do not have battery-backup capabilities, since they are not expected to operate during a power outage. In other words, only devices whose operations are considered to be critical during a power outage may actually be equipped with a battery-backup or other power-protection system.

An important network characteristic in many IoT networks, such as in Smart Grid AMI networks, is the network (re)formation time, such as after a power restoration event. A utility, for example, may have certain operational requirements regarding the amount of time needed for the network to come back online after a power outage event. While unprotected devices without battery backups (e.g. electric meters) are not expected to operate during a power outage, they are still expected to rejoin the network quickly to provide Power Restoration Notification (PRN) messages and additional operational feedback that may be useful to the utility regarding the power outage/restoration. In addition, Power Outage Notifications (PONs) may be sent by still functioning devices during a power outage event, to alert the utility to the outage.

An OMS of a utility may use PONs and PRNs in a number of different ways. For example, PRNs following PONs may be used by the OMS to help determine the power outage duration (e.g., momentary, temporary, or sustained). PRNs may also be used to prevent unnecessary truck rolls that may be triggered by PONs (e.g., the deployment of a repair technician to repair the outage). PRNs further provide real-time feedback when working to restore power in the field. In particular, when power is being restored to a service area, the field team needs to determine if their job is done or whether a nested outage exists and more repair work is needed in a different but nearby area. Other types of PRNs may similarly be of importance in other types of IoT networks.

Fast Network Formation Using a Battery-Backed Network Backbone

The techniques herein provide a method for fast network (re)formation in the presence of a battery-backed network backbone. In one aspect, power-protected devices in a network may advertise a routing topology that optimizes paths to the nearest power-protected device (e.g., a nearest protected backbone topology), during or after a power outage. In another aspect, a power-protected device may notify other power-protected devices as to a detected power outage event. In an additional aspect, unprotected nodes may first attempt to form routing paths using the nearest protected backbone topology, to quickly (re)form the network after a power restoration event. In a further aspect, a supervisory device (e.g., a FAR, an NMS, an OMS, etc.) may adjust traffic rate limiters on the network nodes, to account for the reduced capacity associated with using the sub-optimal, protected backbone topology. In yet an additional aspect, the protected devices may stop advertising the protected backbone topology and/or poison optimal routing topologies, in response to a power outage event.

Illustratively, the techniques described herein may be performed by hardware, software, and/or firmware, such as in accordance with the network formation process 248/248a, which may include computer executable instructions executed by the processor 220 (or independent processor of interfaces 210) to perform functions relating to the techniques described herein, e.g., in conjunction with routing process 244. For example, the techniques herein may be treated as extensions to conventional protocols, such as the various PLC protocols or wireless communication protocols, and as such, may be processed by similar components understood in the art that execute those protocols, accordingly.

Specifically, according to various embodiments, a device in a network detects a power outage event in the network. The device causes an unprotected node in the network to use a first routing topology that includes a power-protected backbone, in response to detecting the power outage event. The power-protected backbone includes one or more nodes that are protected against the power outage event and the unprotected node is not protected against the power outage event. The device routes data for the unprotected node using the first routing topology. The device causes the unprotected node to use a second routing topology that optimizes a path from the unprotected node to a root node of the network based on one or more performance criteria.

Operationally, a network may include a power-protected mesh backbone of devices. In such cases, the power-protected devices in the backbone may prepare the network for power restoration by having the protected devices advertise a routing topology that optimizes paths to the nearest power-protected device (e.g., as opposed to optimizing paths to the nearest FAR/Root). As would be appreciated, since the average distance for any IoT device to a protected device is smaller than the distance to a FAR/Root node, forming a network to the nearest protected device happens more quickly than forming an optimal routing topology to the nearest FAR/Root. After some time following a power restoration event or, in general, after the recovery of unprotected devices, the network may then form a routing topology that optimizes paths across all devices, regardless of whether those devices are power-protected devices.

Figure 5A:
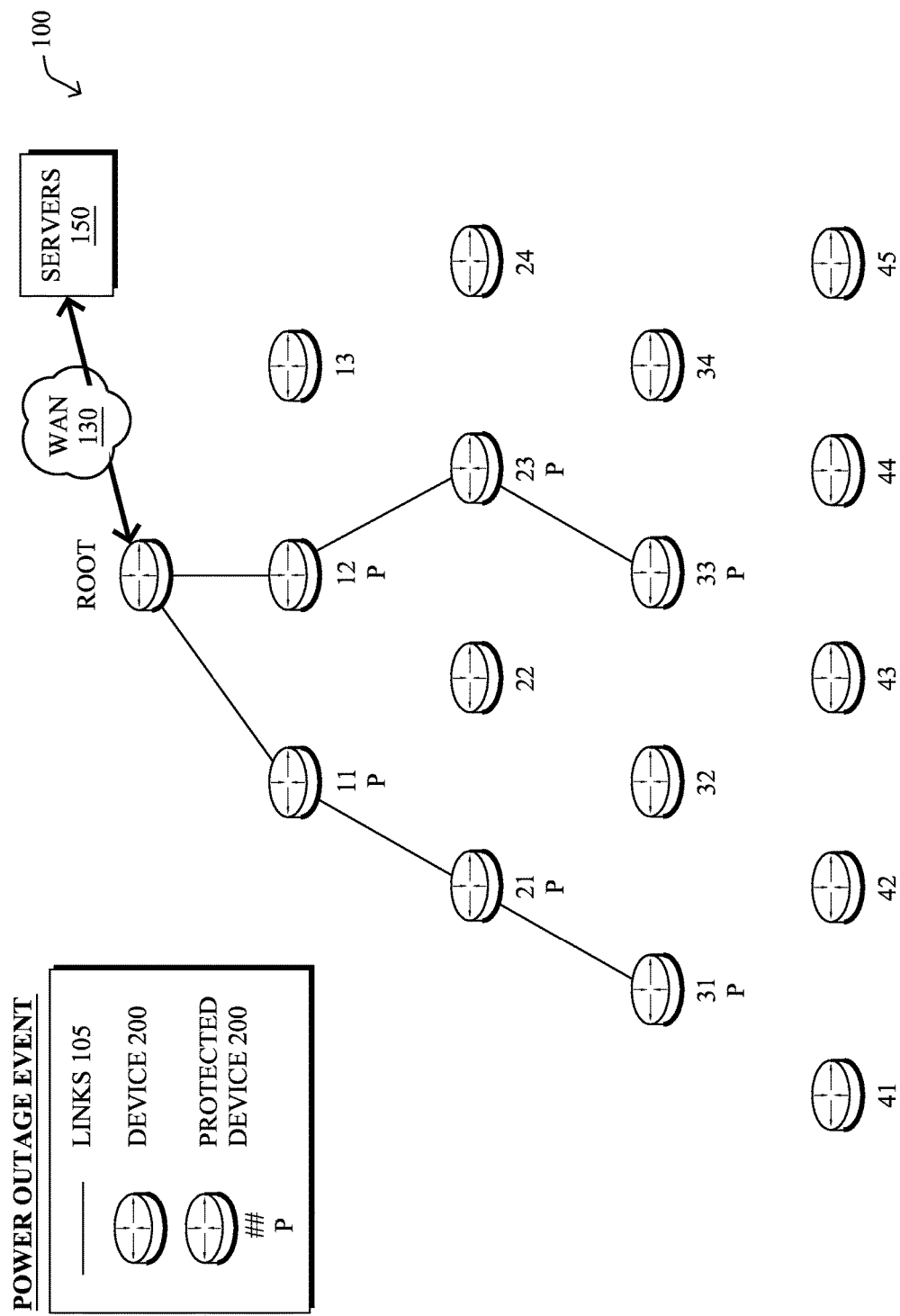
FIGS. 5A-5E illustrate an example of nodes in the network forming a DAG having a power-protected backbone.

Referring now to FIGS. 5A-5E, an example is shown of nodes in network 100 forming a routing topology/DAG having a power-protected backbone, according to various embodiments. As shown in FIG. 5A, assume that nodes 11-12, 21, 23, 31, and 33 are protected against a power outage event (e.g., the devices have battery backup systems as part of their power supplies 260, etc.) and form a power-protected backbone within network 100. Also as shown, during a power outage event, unprotected devices/nodes (e.g., nodes 13, 22, 24, 32, 34, and 41-45) may lose power and, thus, connectivity to network 100.

Figure 5B:
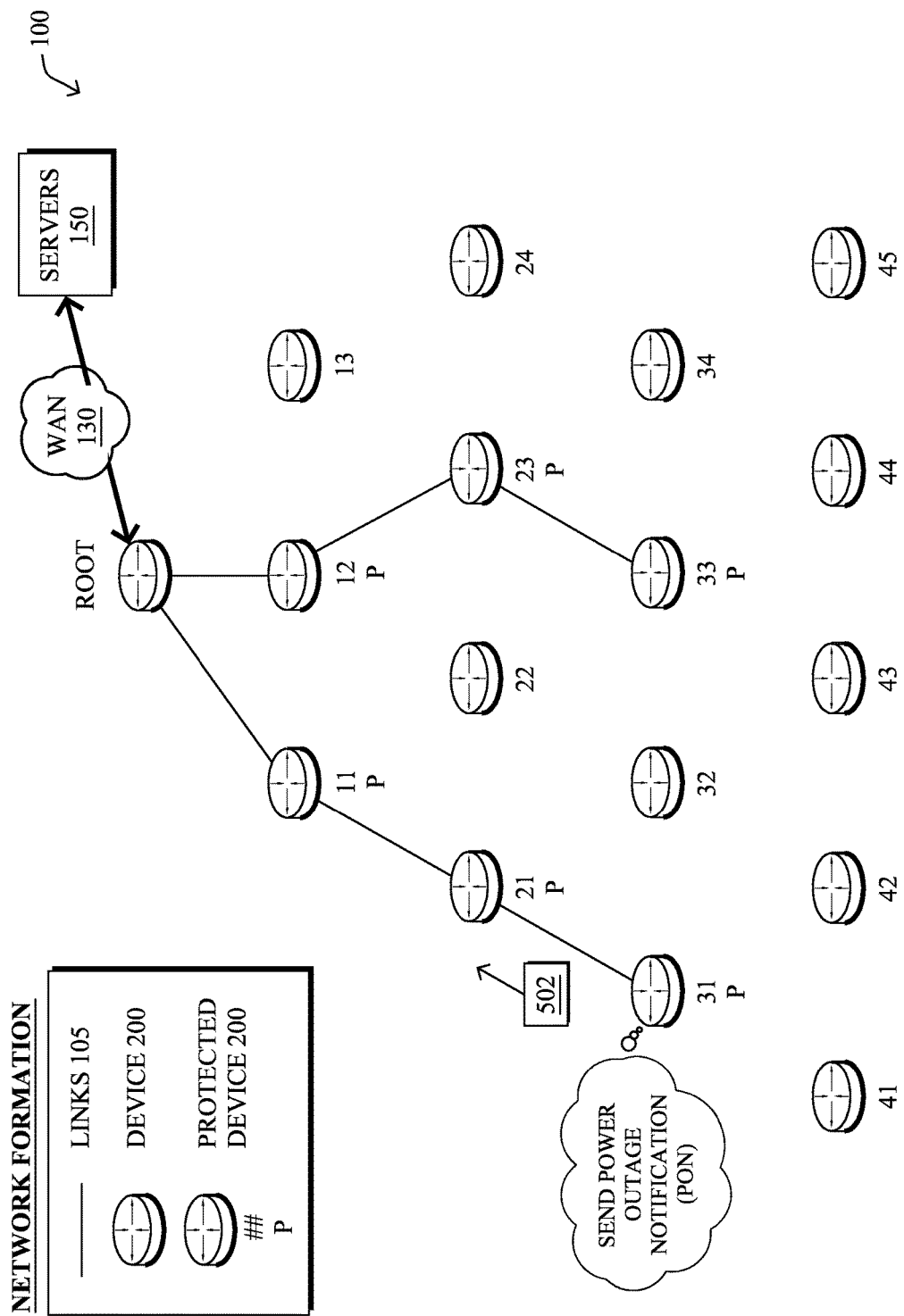

According to some embodiments, power-protected devices in a network may be configured to detect when a power outage event takes place and alert other power-protected devices as to the outage event. Notably, the power-protected devices may need to be aware of the power outage condition, before being able to initiate fast reformation of the network using the power-protected backbone. In some embodiments, a power-protected device may determine that a power outage condition exists by intercepting/analyzing a PON sent by another device. For example, as shown in FIG. 5B, node 31 may send a PON message 502 to the OMS (e.g., one of servers 150) via the FAR/Root and protected device 21, when the power outage occurs.

Figure 5C:
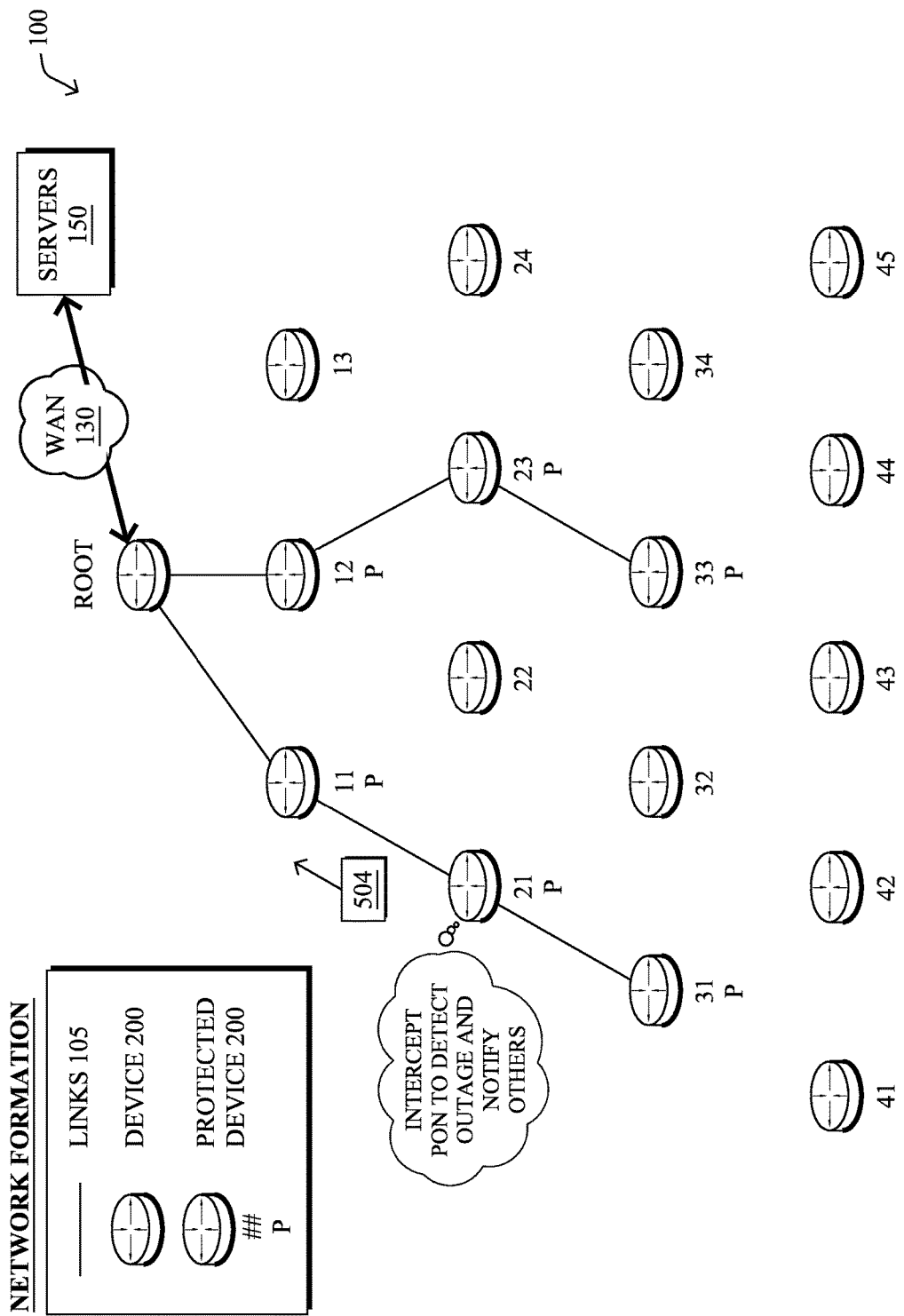

In response to determining that a power outage condition exists, a power-protected device may alert the other power-protected devices in the protected backbone as to the existence of the outage condition (e.g., to facilitate fast reformation of the network using the protected backbone). For example, as shown in FIG. 5C, node 21 may determine that a power outage condition exists based on PON message 502 and, in response, send a notification 504 along the power-protected backbone, to alert the other power-protected devices to the outage condition. Alternatively, if node 21 directly detects the power outage condition (e.g., by monitoring line power to node 21), it may immediately send notification 504 to the other power-protected devices along the protected backbone. In yet another embodiment, the FAR/Root may intercept PON message 502 and, in response to determining that a power outage condition exists, may send notifications 504 along the backbone of power-protected nodes in network 100. In various embodiments, notification 504 may be an instruction that causes a power-protected node to initiate a switchover to a routing topology that is based on the network backbone of power-protected devices.

Figure 5D:
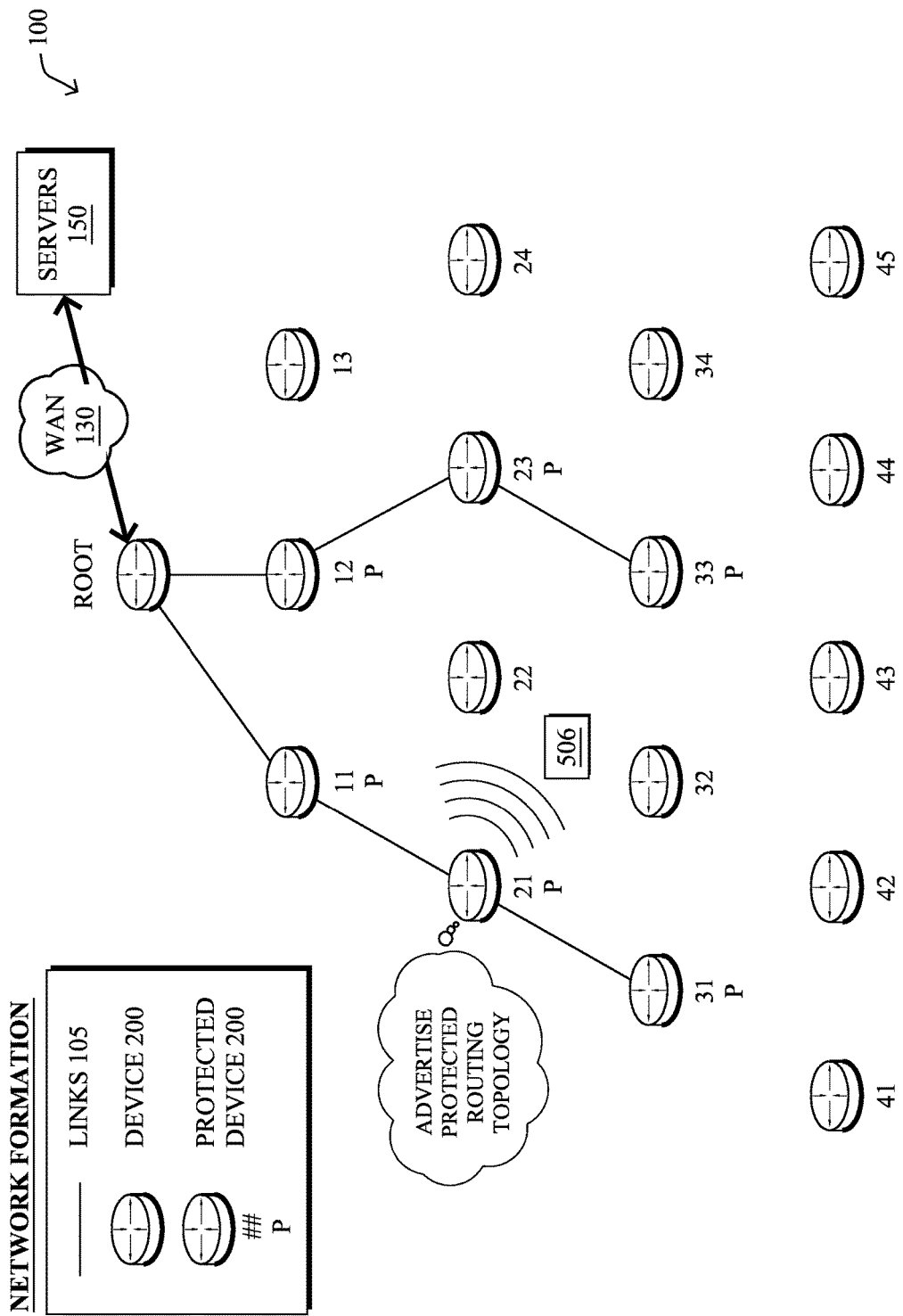

In some embodiments, a power-protected node/device may begin advertising a new routing topology (e.g., a nearest-backbone topology), following a power outage event. For example, as shown in FIG. 5D, power-protected node/device 21 may advertise routing topology information 506 that causes any nearby, unprotected devices to route traffic to its nearest power-protected device. Notably, the power-protected devices may form at least one routing topology (e.g., a battery-backed topology, etc.) with a constraint of using only power-protected devices, after a power outage event. Under normal network operations, however, the power-protected devices may also participate in one or more routing topologies (e.g., a nearest FAR topology) that do not use the power-protected constraint, allowing the mesh to form optimal routes towards their destination via unprotected devices as well. Thus, in conjunction with forming the nearest-backbone topology, the power-protected devices may also be configured to stop advertising and/or poison any optimal routing topologies in place, in response to detecting a power outage event.

In some cases, the power-protected devices in the protected backbone may advertise routing topology information, to cause unprotected nodes that rejoin the network to route traffic to their nearest power-protected devices in the protected backbone. In one embodiment, the advertised routing topology information may indicate that the power-protected backbone has a path cost of zero or approximately zero (e.g., low enough that joining nodes are all but guaranteed to select routes to the nearest power-protected devices). For example, routing topology information 506 advertised by device 21 in FIG. 5D may indicate that the path from node 21 to the FAR/Root has a zero path cost. By advertising a path cost of zero or approximately zero, the power-protected devices essentially operate as a backbone for the mesh and any given unprotected device will attempt to optimize its route towards any of the backbone devices.

Figure 5E:
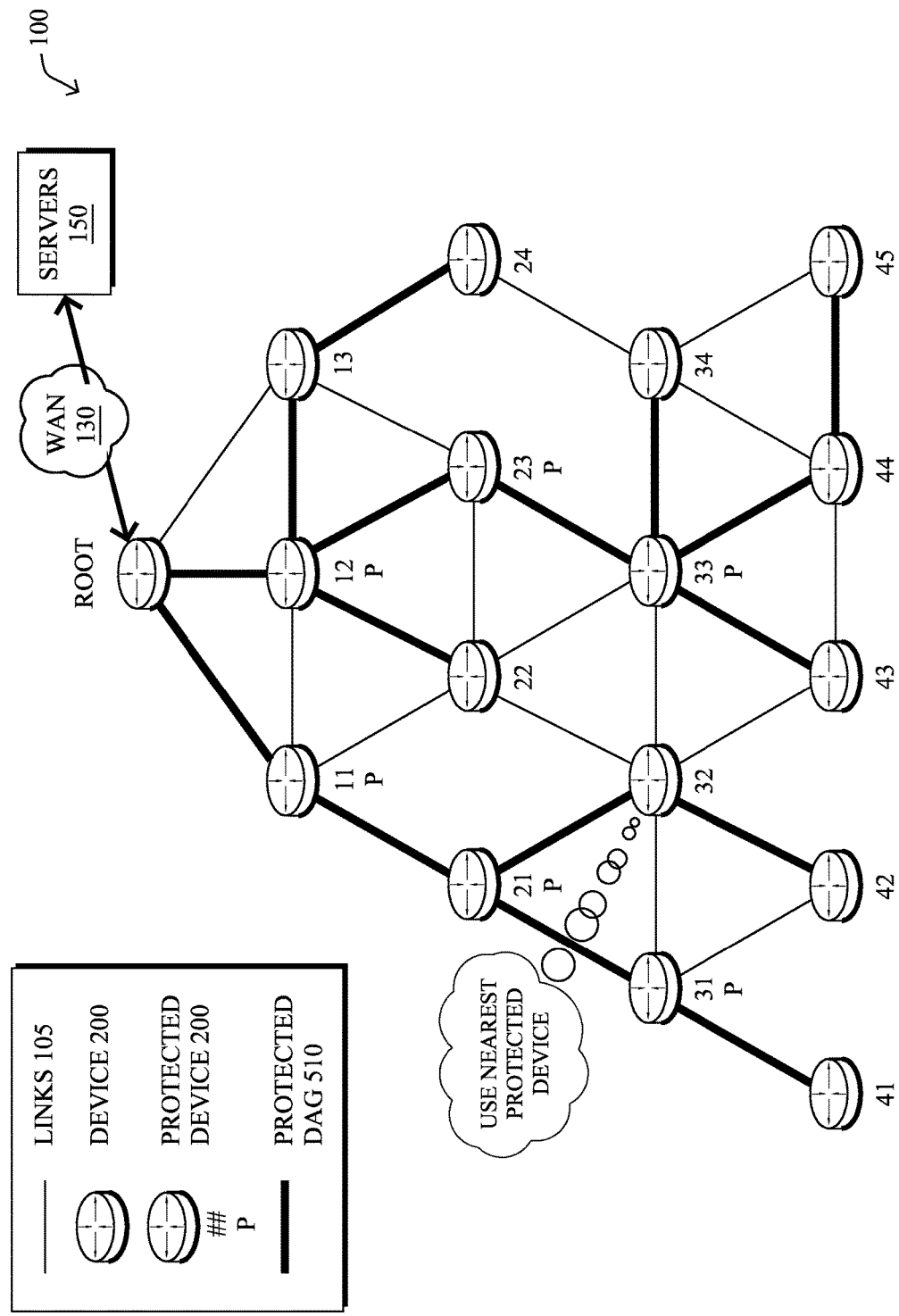

Accordingly, unprotected devices experiencing a power restoration event may first attempt to find a path to the nearest backbone device (e.g., a nearest-backbone topology). In other words, a device without a battery backup system or other power protection mechanism may first attempt to form a routing topology towards the nearest power-protected device in the power-protected backbone. For example, as shown in FIG. 5E, assume that power has been restored to unprotected node 32. In response to receiving the advertised routing topology information 506, node 32 may opt to route traffic to node 21 (e.g., to use node 21 as its parent node in the nearest-backbone topology). This process may continue until some or all of the unprotected nodes in network 100 have rejoined the network and form a protected routing topology/DAG 510 that includes a backbone of power-protected devices.

As would be appreciated, the average distance from any node/device to a power-protected device in the backbone will typically be smaller than the distance to the nearest FAR/Root node. For example, node 32 shown in FIG. 5E is only a single hop away from power-protected node 21, whereas node 32 is at least three hops away from the FAR/Root node. As a result, the routing protocol (e.g., RPL, etc.) does not require as much time to propagate routing information and converge to a functional routing topology. For this reason, having devices first find the shortest path to any backbone device rather than a FAR/Root allows the network to form more quickly, such as after a power outage event.

While a nearest-backbone routing topology affords faster network formation times, the formed topology does not typically provide optimal paths to the FAR/Root node. For example, in FIG. 5E, node 34 may use power-protected device 33 in DAG 510 as its parent node (e.g., to send a PRN message to the OMS, etc.), since device 33 is its nearest power-protected device. However, as shown in FIG. 4, node 34 may instead use unprotected node 24 as its parent in the optimal DAG 410. Notably, the path from node 34 to the FAR/Root in DAG 510 via node 33 requires four hops, whereas the path from node 34 to the FAR/Root in DAG 410 via unprotected node 24 only requires three hops. The selected path in DAG 410 may also exhibit other characteristics according to the objective function (e.g., in terms of delay, jitter, a dropped packet or retransmission rate, etc.) that would otherwise make routing traffic from node 34 to node 24 a more optimal routing solution.

Figure 6A:
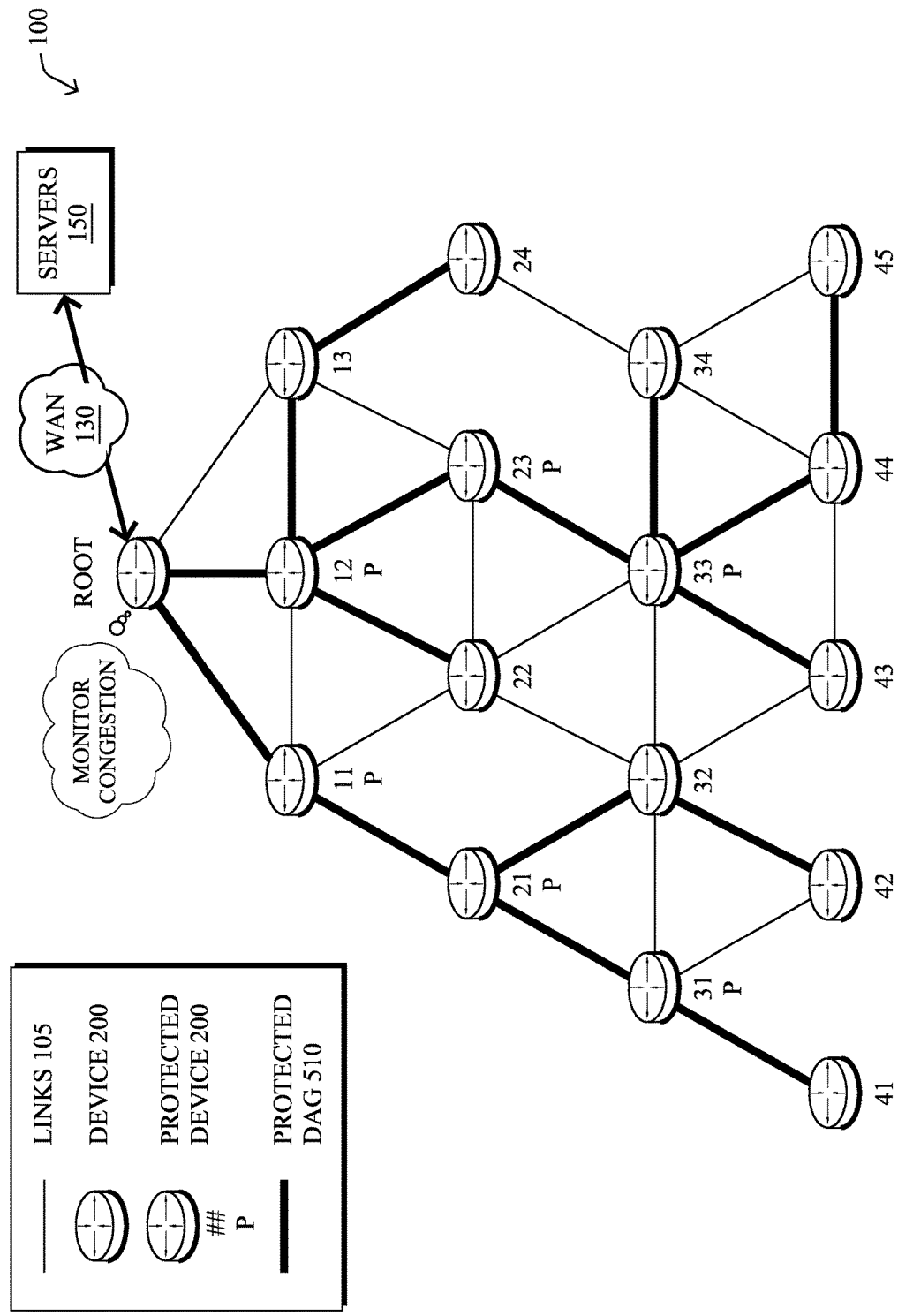
FIG. 6A-6B illustrate an example of a supervisory device rate limiting traffic sent using a DAG having a power-protected backbone.
Figure 6B:
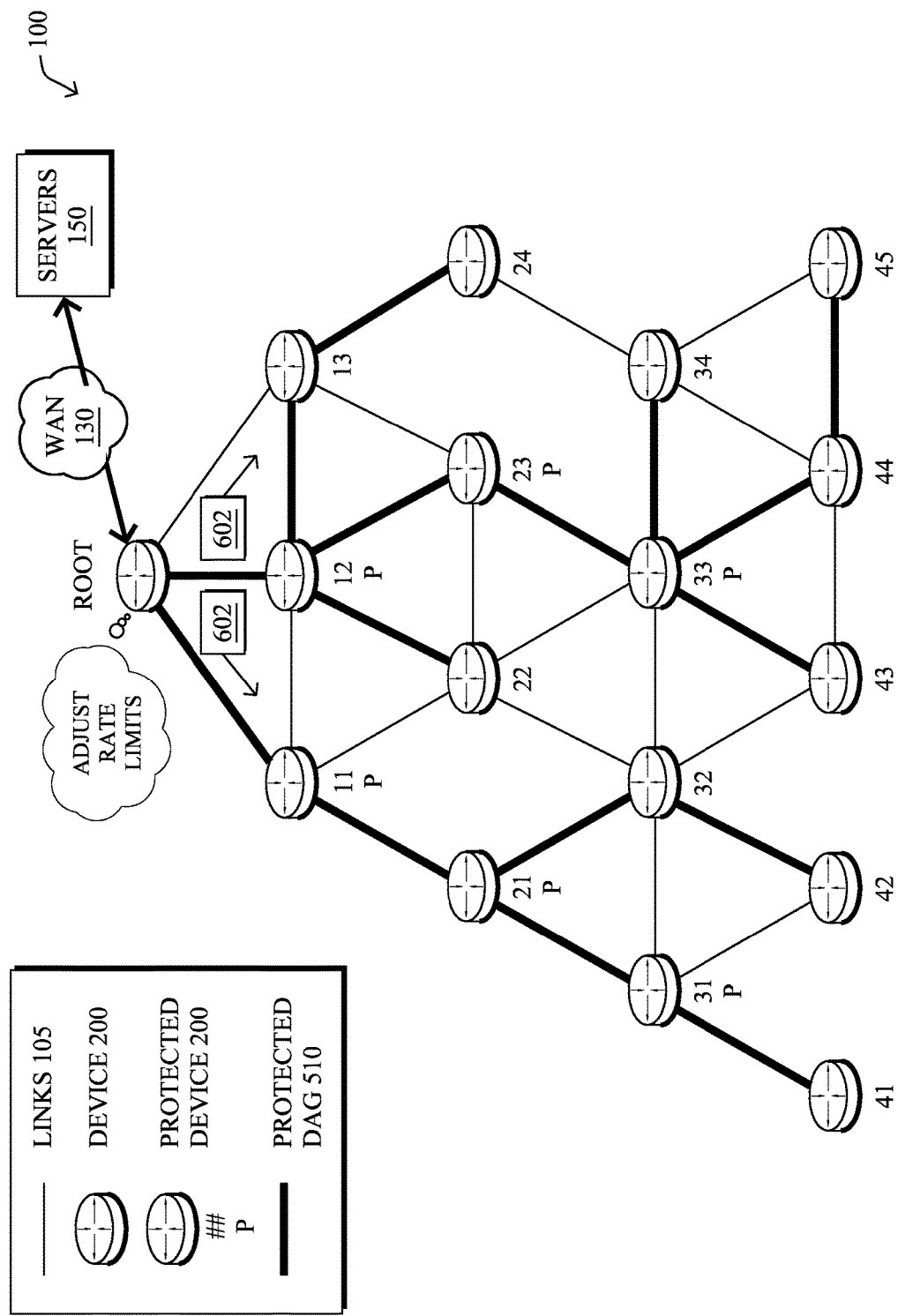

In some embodiments, a rate limiting mechanism may be used in the network, in conjunction with a routing topology in which an unprotected node routes traffic to its nearest power-protected device. In particular, since the nearest-backbone topology typically uses suboptimal paths, the capacity of the network may also be reduced when using this routing topology. To account for the reduced capacity, a supervisory device (e.g., the FAR/Root, an NMS, etc.) may monitor the amount of congestion in the network. For example, as shown in FIG. 6A, the FAR/Root node may monitor the congestion rate in the network during the period of time where devices are restored and start to use the nearest-backbone topology (e.g., DAG 510) and/or the convergence of the routing protocol to re-establish the optimal path. In response to determining that congestion exists and/or the congestion rate is above a threshold limit, the supervisory device may instruct one or more nodes in the network to rate limit their traffic flows. For example, as shown in FIG. 6B, the FAR/Root may compute a rate limiter value and send instructions 602 to the nodes/devices in network 100 that cause the nodes/devices to rate limit their traffic flows, accordingly. This process may be dynamically adjusted any number of times by the FAR/Root.

Figure 7A:
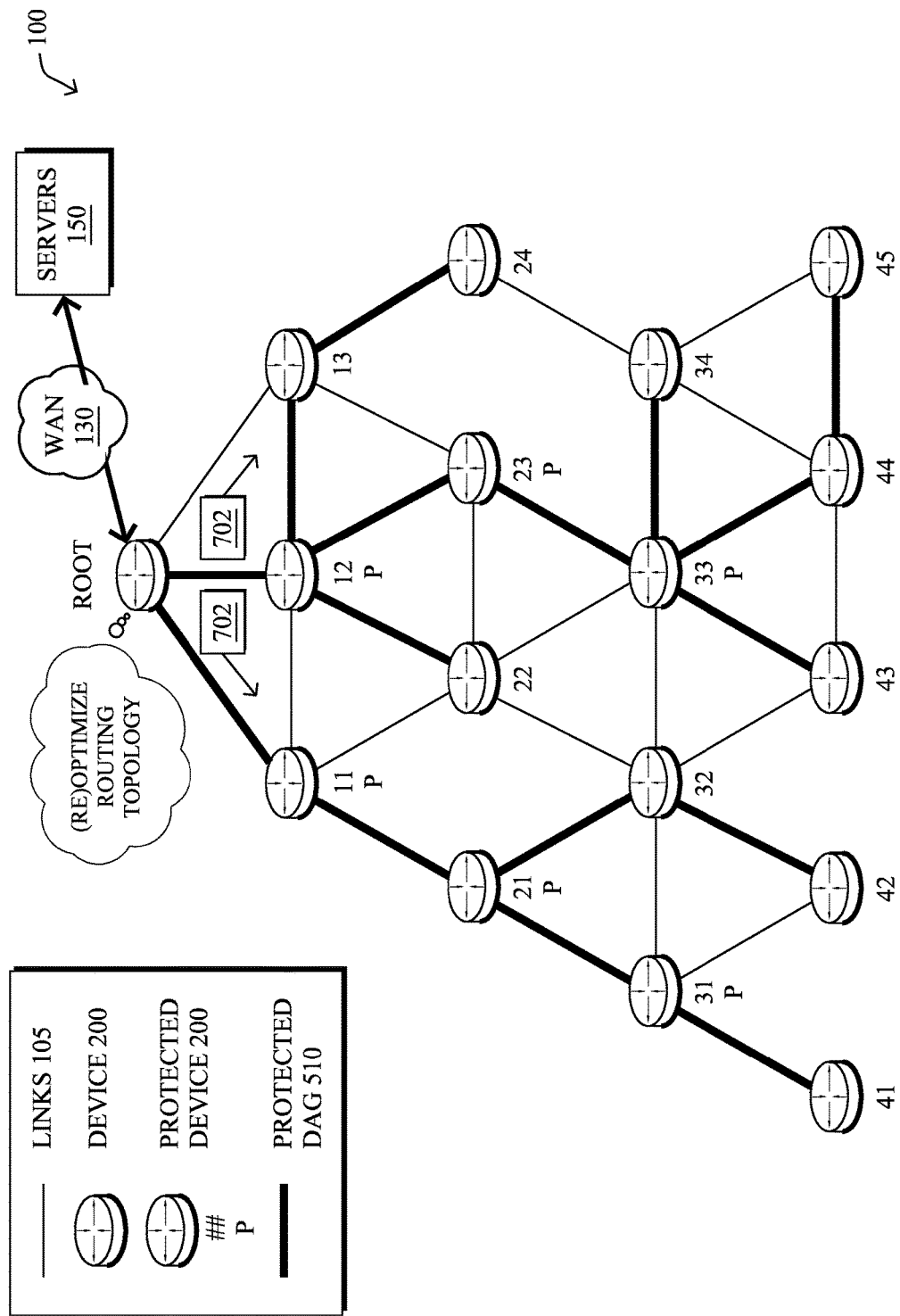
FIGS. 7A-7C illustrate examples of an optimized routing topology being restored to the network.

Once the network can begin returning to normal operation, the IoT devices may begin forming the optimal routing topology (e.g., a nearest-FAR topology, etc.), sometime in the future. In one embodiment, a supervisory device (e.g., a FAR, NMS, etc.) may then configure the devices to begin advertising new routing topologies that provide optimal paths. For example, as shown in FIG. 7A, the FAR/Root node may send instructions 702 to the nodes in network 100 that cause the nodes to form a more optimal routing topology (e.g., DAG 410). In another embodiment, one or more devices (e.g., the FAR/Root, nodes/devices, etc.) may locally determine that services following a power restoration event are no longer communicating traffic via the nearest-backbone topology (e.g., sending PRNs, etc.) and thus additional control traffic overhead may be used to construct more optimal routing topologies.

Figure 7B:
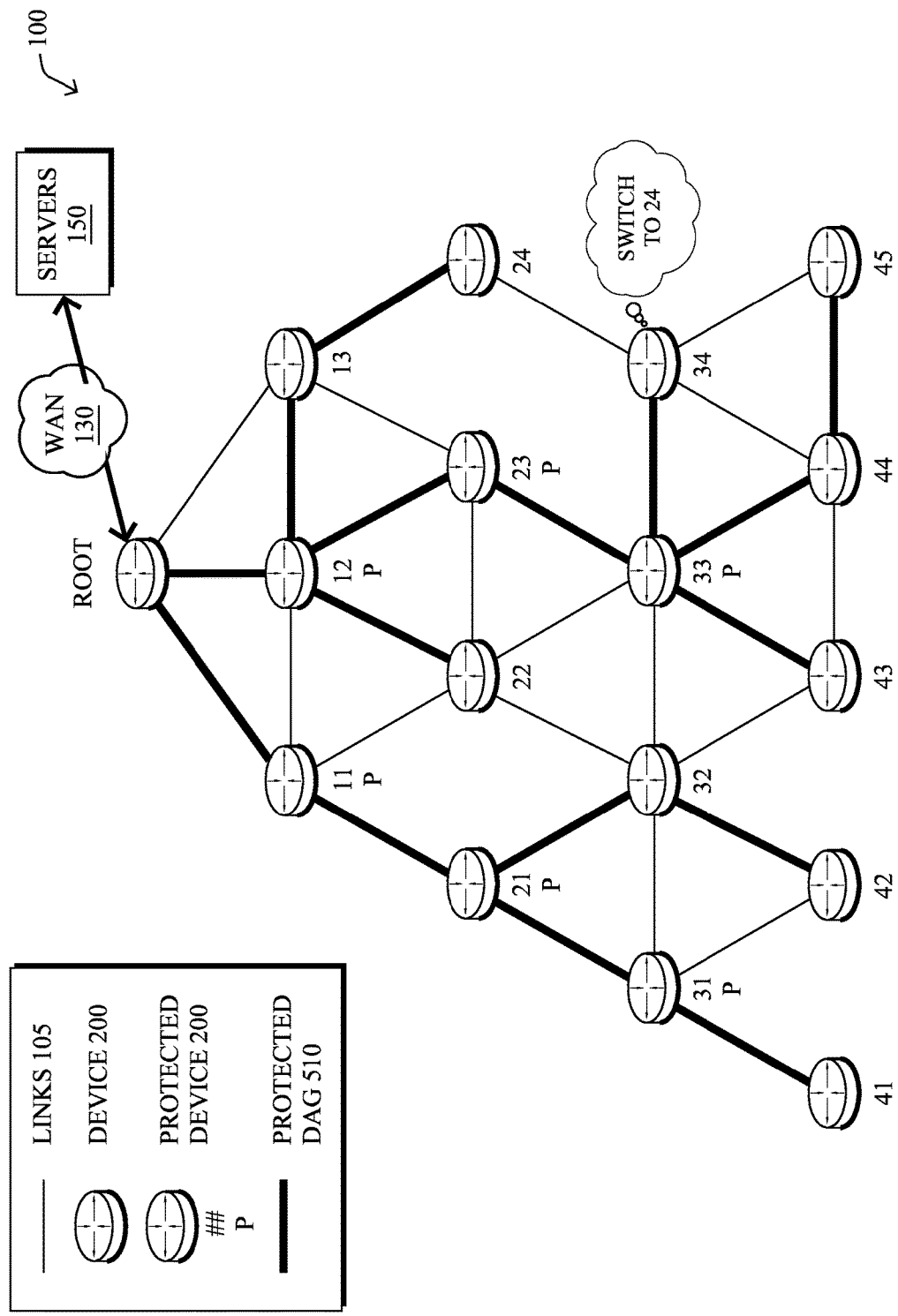

Said differently, the techniques herein allow the IoT devices in the network to form optimal routing paths towards their intended destination (e.g., the FAR/Root, etc.), at some point in time after power has been restored and the network has been reformed. Notably, during a power outage, only power-protected devices will be operational and have a routing topology formed with the nearest power-protected constraint. Following a power restoration event, the IoT network may then essentially form two topologies: (i) the backbone topology that includes the power-protected devices and (ii) the nearest-backbone topology (e.g., an extension of the backbone topology that includes unprotected nodes routing traffic to the backbone). The network may utilize these routing topologies to quickly deliver PRN messages and other critical messages that may be necessary following a power restoration event. At some point in time, the devices may then switch to forming a more optimal routing topology, according to one or more performance criteria (e.g., performance metrics associated with the objective function). For example, as shown in FIG. 7B, node 34 may switch from routing traffic to its nearest power-protected device (e.g., node 33) to its more optimal parent, node 24.

Figure 7C:
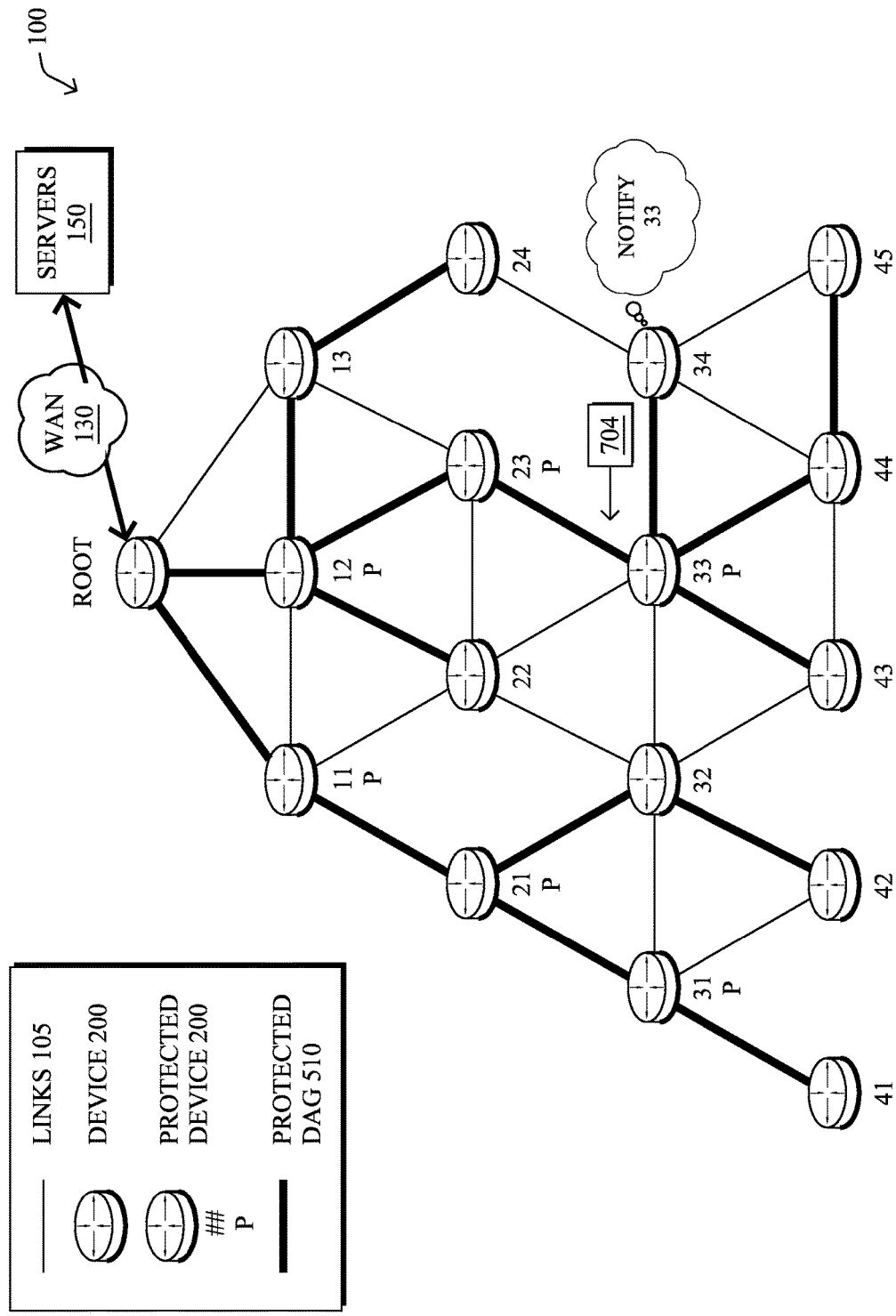

As mentioned above, power-protected devices may begin advertising more optimal routing topologies once PRNs and other messages related to power restoration have been communicated (e.g., as determined by a supervisory device). Alternatively, a restored, unprotected device may notify its nearest power-protected device that it has found another path through another unprotected device. For example, as shown in FIG. 7C, node 34 may notify node 33 that it has discovered another path through unprotected node 24. This information may then be used by the power-protected devices to determine when to effect the switchover from the nearest-backbone topology to a more optimal topology (e.g., by poisoning the zero cost path, advertising the true metrics of the backbone, etc.).

Figure 8:
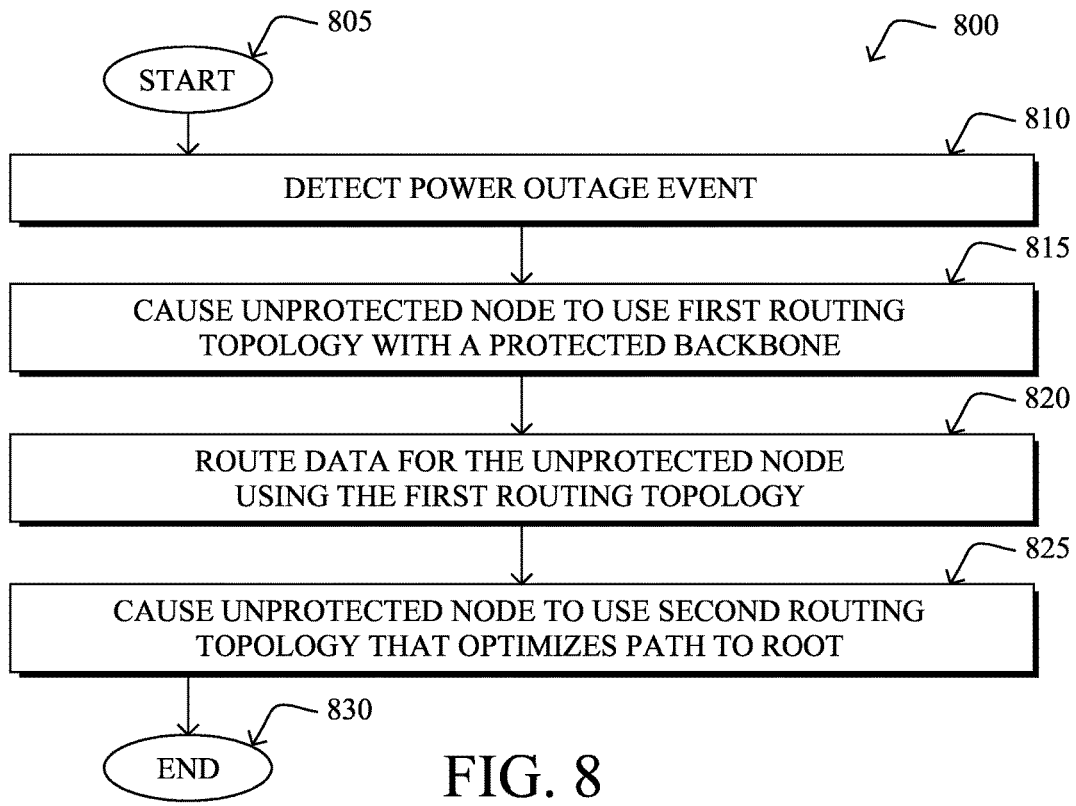
FIG. 8 illustrates an example simplified procedure for using a routing topology with a power-protected backbone.

FIG. 8 illustrates an example simplified procedure for using a routing topology with a power-protected backbone, in accordance with one or more embodiments herein. In general, the procedure 800 may be performed by any network node/device (e.g., node 200) that is protected against a power outage event. For example, the device may typically be equipped with a battery backup system that allows the device to continue to function during the outage. The procedure 800 may start at step 805 and continue on to step 810 where, as described in greater detail above, the device detects a power outage event. In one embodiment, the device may detect the power outage event directly (e.g., the device switches over to using its alternate power source, the device loses connectivity to its unprotected neighbors, etc.). In another embodiment, the device may detect the power outage event by inspecting a PON message routed through the device by another node in the network.

At step 815, as detailed above, the device may cause an unprotected node to use a first routing topology that includes a backbone of power-protected devices. In particular, such a topology may be such that the unprotected node uses the shortest path between itself and its nearest power-protected device, after power is restored to the unprotected node. In one embodiment, the device may cause the unprotected node to use the first routing topology by advertising routing topology information to the unprotected node that causes the unprotected node to use a route to the nearest power-protected device. For example, the advertised routing topology information may indicate that the power-protected backbone has an associated path cost of zero or approximately zero, thereby causing the unprotected node to select a path to the nearest member of the backbone.

At step 820, the device routes data for the unprotected node using the first routing topology, as described in greater detail above. For example, after rejoining the network following a power restoration event, the node may send a PRN message to the OMS via the device according to the first routing topology. Other traffic may also include any other data that may be communicated by the node (e.g., status information, etc.).

At step 825, the device causes the unprotected node to use a second routing topology that optimizes a path between the unprotected node and a root node of the network, according to various embodiments. Notably, the first routing topology in which the unprotected node routes traffic to its nearest power-protected device may not afford the unprotected node an optimal routing path to the FAR/Root, according to one or more performance criteria. Such criteria may include, but are not limited to, an amount of delay along the path from the unprotected node to the root node, a number of hops along the path from the unprotected node to the root node, an amount of packet loss along the path from the unprotected node to the root node, combinations thereof, or the like. As would be appreciated, the unprotected node may use a different parent in the second, optimal routing topology than it uses in the first routing topology. In various embodiments, the device may cause the unprotected node to use the second routing topology in response to receiving an instruction to do so from a supervisory device (e.g., the FAR/Root, an NMS, an OMS, etc.). Procedure 800 then ends at step 830.

Figure 9:
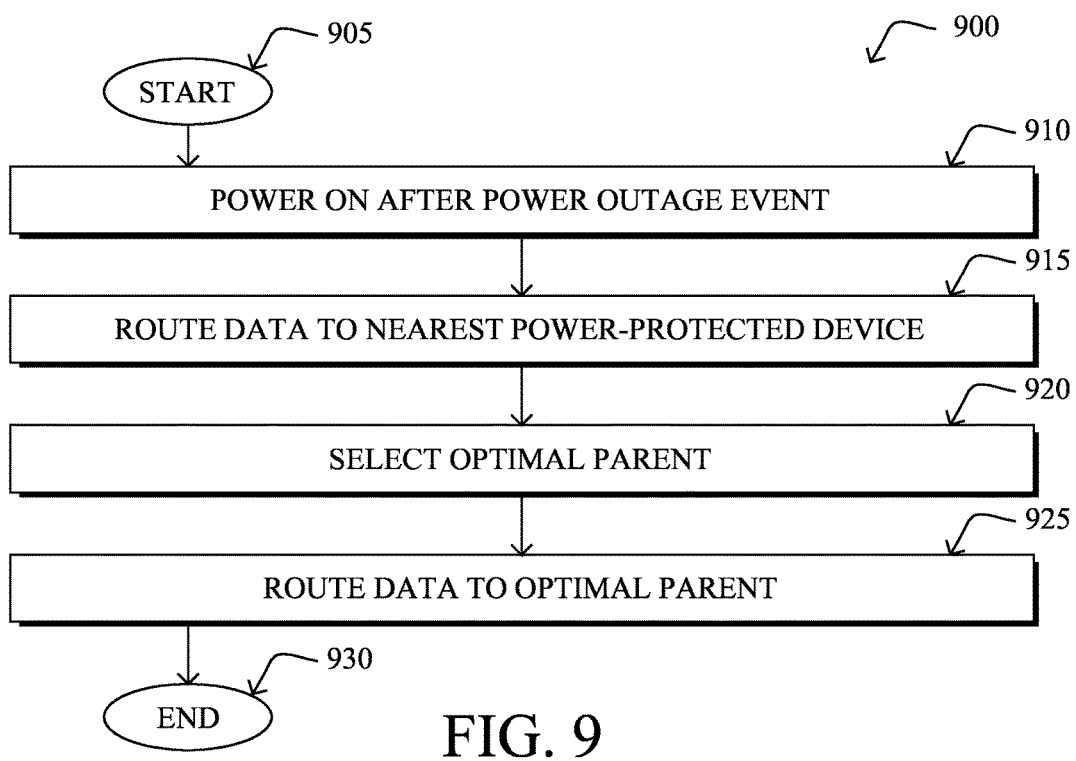
FIG. 9 illustrates an example simplified procedure for switching between routing topologies.

FIG. 9 illustrates an example simplified procedure for switching between routing topologies, in accordance with various embodiments herein. Procedure 900 may be performed, for example, by a node/device (e.g., device 200) that seeks to rejoin a network after a power outage event that includes a backbone of power-protected devices. The procedure 900 may begin at step 905 and continue on to step 910 where, as described in greater detail above, the node powers on after a power outage event in the network. This may correspond to, for example, the node powering itself on after it begins receiving power again (e.g., from an electrical power line).

At step 915, the node routes data to its nearest power-protected device, as described in greater detail above. In various embodiments, the node may receive an advertisement of routing topology information from the power-protected device that indicates a zero cost or approximately zero cost associated with routing traffic via the power-protected device. Thus, nodes that rejoin the network may use a routing topology that seeks to route traffic from the nodes to their nearest power-protected devices. The data routed to the nearest power-protected device may be, for example, a PRN message that the node sends to the OMS or another supervisory device, indicating that power has been restored to the node.

At step 920, as detailed above, the node selects an optimal parent through which the node is to route traffic. As would be appreciated, routing traffic from the node to its nearest power-protected device may or may not provide the node with an optimal path to its destination (e.g., the FAR/Root of the network). Example performance criteria that may be used to define the optimal path may include, but are not limited to, an amount of delay along the path from the unprotected node to the root node, a number of hops along the path from the unprotected node to the root node, or an amount of packet loss along the path from the unprotected node to the root node. In various embodiments, the node may select its optimal parent as part of the formation of an optimal routing topology based on the performance criteria (e.g., as part of the objective function used to form the topology). As would be appreciated, the parent of the node in the optimal topology may differ from its parent in the topology that seeks to route traffic to the nearest power-protected device, depending on the performance criteria used to construct the optimal topology and the characteristics of the network.

At step 925, the node routes traffic to its optimal parent as part of the optimal routing topology, as described in greater detail above. Notably, at some point in time after power has been restored to the network (e.g., after a threshold number of nodes have reported PRNs, etc.), the network may switch over to using a more optimal routing topology. For example, a smart meter may route a PRN through its nearest power-protected device after power is restored to the meter, but later on route meter readings to the FAR/Root of the network via its optimal parent. Procedure 900 then ends at step 930.

It should be noted that while certain steps within procedures 800-900 may be optional as described above, the steps shown in FIGS. 8-9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 800-900 are described separately, certain steps from each procedure may be incorporated into each other procedure, and the procedures are not meant to be mutually exclusive.

The techniques herein, therefore, provide for fast network (re)formation using a power-protected (e.g., battery-backed) network backbone. Because the average distance from an arbitrary IoT device to a power-protected device is smaller than to the nearest FAR/Root, the network can form more quickly. Having the network form more quickly following a power restoration event allows the network to deliver PRN messages and other critical messages necessary during power restoration. Notably, in some cases, network operation, even if sub-optimal, may be critical to certain entities, such as utilities.

While there have been shown and described illustrative embodiments that provide for fast network (re)formation using a battery-backed backbone, it is to be understood that various other adaptations and modifications may be made within the spirit and scope of the embodiments herein. For example, the embodiments have been shown and described herein with relation to PLC networks. However, the embodiments in their broader sense are not as limited, and may, in fact, be used with other types of shared-media networks and/or protocols (e.g., wireless). In addition, while certain protocols are shown, such as RPL, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    detecting, by a device in a network, a power outage event in the network;
    advertising, by the device, a power-protected backbone to an unprotected node as having a path cost of approximately zero to cause the unprotected node in the network to use a first routing topology that includes the power-protected backbone, in response to detecting the power outage event, wherein the power-protected backbone includes one or more nodes that are protected against the power outage event and the unprotected node is not protected against the power outage event;
    routing, by the device, data for the unprotected node using the first routing topology; and
    causing, by the device, the unprotected node to use a second routing topology that optimizes a path from the unprotected node to a root node of the network based on one or more performance criteria.

2. The method as in claim 1, wherein detecting the power outage event comprises:
    analyzing, by the device, a power outage notification (PON) received by the device from a particular node in the network.

3. The method as in claim 1, wherein detecting the power outage event comprises:
    receiving, at the device, a notification from a particular node in the network that the power outage event is occurring.

4. The method as in claim 1, wherein the device is a parent of the unprotected node in the first routing topology and is not a parent of the unprotected node in the second routing topology.

5. The method as in claim 1, wherein the device causes the unprotected node to use the second routing topology in response to receiving an instruction to stop using the first routing topology.

6. The method of claim 1, wherein the one or more performance criteria comprise at least one of: an amount of delay along the path from the unprotected node to the root node, a number of hops along the path from the unprotected node to the root node, or an amount of packet loss along the path from the unprotected node to the root node.

7. A method, comprising:
    powering on, by a node in a network, after a power outage event in the network;
    receiving, at the node, routing topology information that indicates a path cost associated with a power-protected backbone as being approximately zero;
    routing, by the node, data using a first routing topology that includes the power-protected backbone, wherein the first routing topology includes a path from the node to a power-protected device in the backbone that is nearest to the node in the network;
    selecting, by the node, a parent of the node as part of a second routing topology that optimizes a path from the node to a root of the network based on one or more performance criteria; and
    routing, by the node, data via the selected parent using the second routing topology.

8. The method as in claim 7, wherein the power-protected device that is nearest to the node differs from the selected parent of the node.

9. The method as in claim 7, further comprising:
    rate limiting, by the node, the data routed using the first routing topology.

10. The method as in claim 7, wherein the data routed using the first routing topology comprises a power restoration notification (PRN).

11. An apparatus, comprising:
one or more network interfaces to communicate with a network;
a processor coupled to the one or more network interfaces and configured to execute a process; and
a memory configured to store the process executable by the processor, the process when executed operable to:
detect a power outage event in the network;
advertising, by the device, a power-protected backbone to an unprotected node as having a path cost of approximately zero to cause the unprotected node in the network to use a first routing topology that includes the power-protected backbone, in response to detecting the power outage event, wherein the power-protected backbone includes one or more nodes that are protected against the power outage event and the unprotected node is not protected against the power outage event;
route data for the unprotected node using the first routing topology; and
cause the unprotected node to use a second routing topology that optimizes a path from the unprotected node to a root node of the network based on one or more performance criteria.

12. The apparatus as in claim 11, wherein the apparatus detects the power outage event by:
analyzing a power outage notification (PON) received from a particular node in the network.

13. The apparatus as in claim 11, wherein the apparatus detects the power outage event by:
receiving a notification from a particular node in the network that the power outage event is occurring.

14. The apparatus as in claim 11, wherein the apparatus is a parent of the unprotected node in the first routing topology and is not a parent of the unprotected node in the second routing topology.

15. The apparatus as in claim 11, wherein the apparatus causes the unprotected node to use the second routing topology in response to receiving an instruction to stop using the first routing topology.

16. The apparatus as in claim 11, wherein the one or more performance criteria comprise at least one of: an amount of delay along the path from the unprotected node to the root node, a number of hops along the path from the unprotected node to the root node, or an amount of packet loss along the path from the unprotected node to the root node.

17. An apparatus, comprising:
one or more network interfaces to communicate with a network;
a processor coupled to the one or more network interfaces and configured to execute a process; and
a memory configured to store the process executable by the processor, the process when executed operable to:
power on the apparatus after a power outage event in the network;
receive routing topology information that indicates a path cost associated with a power-protected backbone as being approximately zero;
route data using a first routing topology that includes the power-protected backbone, wherein the first routing topology includes a path from the apparatus to a power-protected device in the backbone that is nearest to the apparatus in the network;
select a parent of the apparatus as part of a second routing topology that optimizes a path from the apparatus to a root of the network based on one or more performance criteria; and
route data via the selected parent using the second routing topology.

18. The apparatus as in claim 17, wherein the power-protected device nearest to the apparatus differs from the selected parent of the apparatus.

19. The apparatus as in claim 17, wherein the process when executed is further operable to:
rate limit the data routed using the first routing topology.

20. The apparatus as in claim 17, wherein the data routed using the first routing topology comprises a power restoration notification (PRN).

21. A tangible, non-transitory, computer-readable media having software encoded thereon, the software when executed by a processor of a device operable to:
detect a power outage event in the network;
advertising, by the device, a power-protected backbone to an unprotected node as having a path cost of approximately zero to cause the unprotected node in the network to use a first routing topology that includes the power-protected backbone, in response to detecting the power outage event, wherein the power-protected backbone includes one or more nodes that are protected against the power outage event and the unprotected node is not protected against the power outage event;
route data for the unprotected node using the first routing topology; and
cause the unprotected node to use a second routing topology that optimizes a path from the unprotected node to a root node of the network based on one or more performance criteria.

22. A tangible, non-transitory, computer-readable media having software encoded thereon, the software when executed by a processor of a node in a network operable to:
power on the node after a power outage event in the network;
receive routing topology information that indicates a path cost associated with a power-protected backbone as being approximately zero;
route data using a first routing topology that includes the power-protected backbone, wherein the first routing topology includes a path from the node to a power-protected device in the backbone that is nearest to the node in the network;
select a parent of the node as part of a second routing topology that optimizes a path from the node to a root of the network based on one or more performance criteria; and
route data via the selected parent using the second routing topology.

* * * * *